United States Patent

Kurokawa

Patent Number: 5,716,766
Date of Patent: Feb. 10, 1998

[54] METHOD AND APPARATUS FOR THE ELECTROLYTIC TREATMENT OF BLEACH-FIX BATHS, AS WELL AS AN APPARATUS FOR PROCESSING PHOTOGRAPHIC MATERIALS

[75] Inventor: Toshio Kurokawa, Kanagawa, Japan

[73] Assignee: Fuji Photo Film Co., Ltd., Kanagawa, Japan

[21] Appl. No.: 648,822

[22] Filed: May 16, 1996

[30] Foreign Application Priority Data

May 18, 1995 [JP] Japan ................. 7-142389

[51] Int. Cl.⁶ ........................................... G03C 7/44
[52] U.S. Cl. ............................... 430/400; 430/398
[58] Field of Search ................................ 430/398, 400

[56] References Cited

U.S. PATENT DOCUMENTS 3,615,507 10/1971 Bard et al. ..................... 430/400
3,634,088 1/1972 Cooley ............................ 430/400
4,014,764 3/1977 Seiler et al. ..................... 430/400
4,036,715 7/1977 Baden et al. ................... 430/400
4,313,808 2/1982 Idemoto et al. ............... 430/399
5,298,371 3/1994 Nakamura ..................... 430/400

FOREIGN PATENT DOCUMENTS

48-18191 3/1973 Japan.

Primary Examiner—Hoa Van Le
Attorney, Agent, or Firm—Sughrue, Mion, Zinn, Macpeak & Seas, PLLC

[57] ABSTRACT

A method for the electrolytic treatment of a bleach-fix bath by which an anode and a cathode that are submerged in the spent bleach-fix bath are supplied with an electric current whereby the silver dissolved in the spent bleach-fix bath as a silver complex salt is precipitated at the cathode, characterized in that the cathode is disengaged from the spent bleach-fix bath when no electric current is applied.

10 Claims, 6 Drawing Sheets

METHOD AND APPARATUS FOR THE ELECTROLYTIC TREATMENT OF BLEACH-FIX BATHS, AS WELL AS AN APPARATUS FOR PROCESSING PHOTOGRAPHIC MATERIALS

BACKGROUND OF THE INVENTION

The present invention relates to a method and an apparatus for the electrolytic treatment of bleach-fix baths in which an anode end a cathode that are submerged within a spent bleach-fix bath resulting from the bleach-fix treatment of color photographic materials are supplied with an electric current, whereby the silver dissolved as a silver complex salt in the spent bleach-fix bath is precipitated at the cathode and, at the same time, the iron salt which has been reduced from a trivalent to a divelent state during the bleach-fix treatment is reoxidized at the anode to be reverted to a trivalent iron salt. The invention also relates to a processor of photographic materials that incorporates the apparatus for electrolytic treatment.

The processing of color photographic materials typically comprises a sequence of steps such as development, bleaching, fixing and washing with water. For enhanced processing efficiency, it is preferred to adopt a bleach-fix treatment which performs bleaching and fixing simultaneously.

As is well known, bleach-fix bath formulations for use in the bleach-fix treatment comprise iron salts (e.g. trivalent iron chelate compounds) as a bleaching agent and silver halide solubilizers as e fixing agent.

When such bleach-fix baths are used to bleach-fix color photographic materials, the trivslent iron chelate compounds in the baths oxidize the developed silver on the color photographic materials and they in turn are reduced to divelent iron salts. The silver ions which have been generated by the oxidation with the trivalent iron chelate compounds are solubilized by the silver halide solubilizers (i.e., the fixing agent in the bleach-fix bath) to dissolve in the bath.

Hence, with the continued processing, the divelent iron salts end silver complex salts gradually build up within the bleach-fix bath to reduce its activity (i.e., it is exhausted). To prevent this phenomenon, one may replace the exhausted bleach-fix bath in the bleach-fix tank with a fresh bath. However, disposing of the exhausted bleach-fix bath without any post treatment is by no means preferred for the purpose of preventing environmental pollution and avoiding the waste of resources.

Under these circumstances, various studies are being made to develop processing techniques by which the activity of spent bleach-fix baths is restored to make them suitable for reuse.

The term "spent bleach-fix bath" has a broad sense and, as used herein, does not mean unprocessed (i.e., as-prepared) mother liquors or replenishers but means than solutions (or running solutions) and their overflows (which may be reused or discarded after recovering valuables). In other words, spent bleach-fix baths cover those solutions with which light-sensitive materials are being processed and those solutions which have been used to process them.

Specific ways of the treatment by which the activity of such spent bleach-fix baths is restored to make them suitable for reuse may comprise recovering the salver dissolved in the spent bleach-fix baths and revert the reduced (divalent) iron salt to a trivalent state.

Various methods have been studied to recover the silver dissolved in spent bleach-fix baths and they include, fur examples:

(1) adding inactive silver salt forming reagents to the spent bleach-fix baths (silver precipitation);

(2) bringing metals of higher ionization tendency that silver into contact with the spent bleach-fix baths (metallic exchange);

(3) causing the silver dissolved in the spent bleach-fix baths to be precipitated at the cathode by electrolytic treatment (electrolytic reduction); and (4) using ion-exchange resins (ion-exchanging).

Various methods have also been studied to revert the divalent iron salts in the spent bleach-fix baths to trivalent iron chelate compounds and the like by oxidation treatment and they include, for examples (a) adding oxidizers to the spent bleach-fix baths (as taught in U.S. Pat. Nos. 3,615,507 and 3,767,401 and West German Patent Application (OLS) 2,143,314);

(b) contact with oxygen (as taught in U.S. Pat. Nos. 3,634,088 and 3,700,450 and West German Patent Application (OLS) 2,113,651); and (c) electrolytic oxidation (as taught in Unexamined Published Japanese Patent Application 18191/1973).

Thus, various approaches are selectable for recovering the silver dissolved in the spent bleach-fix baths and reverting the divelent iron salts in the spent bleach-fix baths to trivelent iron chelate compounds and the like. In recent years, however, researcher's attention is being paid to the processing of the spent bleach-fix baths by an electrolytic treatment since it is effective in both the recovery of silver and the oxidation of divalent iron salts and because it has the potential to suppress the oxidation of sulfite ions, thiosulfate ions, etc. in the spent bleach-fix baths during the oxidation of divelent iron salts. As a further advantage, this electrolytic treatment can be followed by adding the necessary amount of replenishers to compensate for any other components that have been lost during the bleach-fix and electrolytic treatments.

In practice, however, the attempt at restoring the activity of the spent bleach-fix baths by the electrolytic treatment causes several problems.

If an electric current is applied to an anode and a cathode that are submerged in the spent bleach-fix bath resulting from the bleach-fix treatment of color photographic materials, the hypo silver which has been dissolved as a silver complex salt in the spent bleach-fix bath is reduced to be precipitated at the cathode whereas the divalent iron salt is oxidized at the anode to revert to a trivalent iron salt and the activity of the spent bleach-fix bath is gradually restored.

If the activity of the spent bleach-fix bath is restored to a level within a permissible range, the application of the electric current to the anode and the cathode which are submerged within the spent bleach-fix bath is suspended. However, in the presence of the bleaching agent and the fixing agent in the bleach-fix bath which are both silver solubilizers, the cathode cannot be kept submerged in the spent bleach-fix bath because the silver which has been precipitated at the cathode redissolves in the now activated spent bleach-fix bath to reduce not only the yield of silver recovery but also the restored activity of the spent bleach-fix bath.

Another difficulty that may occur is that the iron salt which has been reoxidized to a trivalent state at the anode is reduced again to a divalent state at the cathode during a second application of an electric current.

These problems will unavoidably increase the amount of the replenisher that has to be added to the spent bleach-fix bath.

In order to prevent the redissolution of the silver that has been precipitated at the cathode, various approaches have been taken and they include the following two typical methods: in one method, the spent bleach-fix bath that has been subjected to an electrolytic treatment is transferred into a stock tank as soon as the application of an electric current to the cathode and the anode which have been submerged in the spent bleach-fix bath is discontinued; in the other method, a baas current is applied between the cathode and the anode in such an amount that the silver precipitated at the cathode will not redissolve in the spent bleach-fix bath.

However, these approaches have presented the problem of increasing the size or complexity of the processing system. In the first approach, the system must be equipped with a large stock tank or a large-capacity feed/discharge pump that can achieve rapid transfer of the spent bleach-fix bath into the stock tank. In the second approach, the system has to be equipped with an electric circuit as well as a control circuit for allowing a subtle bias current to the electrodes.

A further problem with those approaches is that they have difficulty in performing in-line processing, in which the spent bleach-fix bath is adjusted to be circulable between the electrolytic cell and the bleach-fix tank for the bleach-fix treatment of color photographic materials and in which the spent bleach-fix bath in the bleach-fix tank is directed into the electrolytic cell over time in parallel with the bleach-fix treatment in the bleach-fix tank such that the activity of the spent bleach-fix bath is restored before it is returned to the bleach-fix tank. Because of this difficulty, the regeneration of the spent bleach-fix bath must be performed batchwise but then it becomes difficult to improve the processing efficiency.

To deal with the inconvenience that the iron salt reoxidized to a trivalent state at the anode is reduced again to a divelent state at the cathode during a second application of an electric current, it has been attempted in the prior art to divide the interior of the electrolytic cell into an anode and a cathode compartments by a diaphragm such as a semipermeable membrane. The use of the diaphragm is effective in eliminating the stated problem but, on the other hand, it presents a new problem in that the diaphragm attenuates the circulation of the spent bleach-fix bath around the anode, thereby reducing the efficiency with which the divelent iron salt is oxidized at the anode.

With a view to realizing a system in which the apparatus for the electrolytic treatment of spent bleach-fix baths is integrated in the photographic processor, efforts are constantly being made to reduce the size of the electrolytic apparatus and adding a bulky agitator that requires an independent drive mechanism is extremely difficult from a practical viewpoint even if it is necessary to improve the circulation of the spent bleach-fix bath around the anode.

SUMMARY OF THE INVENTION

The present invention has been accomplished under these circumstances and has an object providing a method and an apparatus for the electrolytic treatment of bleach-fix baths by which the activity of spent bleach-fix baths, in particular, those which contain iron salts as bleaching agents and which result from the bleach-fix treatment of color photographic materials, can be restored through an electrolytic treatment without employing a large stock tank, agitator or any other bulky devices that are deleterious to the purpose of realizing a compact system.

Another object of the invention is to provide a method and an apparatus for the electrolytic treatment of bleach-fix baths that are capable of performing in-line processing in which the spent bleach-fix bath in a bleach-fix tank is directed into an electrolytic cell over time during the bleach-fix treatment of color photographic materials in the bleach-fix tank and in which the activity of the spent bleach-fix bath is restored before it is returned to the bleach-fix tank, whereby the efficiency of the processing of the color photographic materials is markedly improved.

A further object of the invention is to provide a processor of photographic materials that incorporates the above-stated apparatus for electrolytic treatment.

The above-stated objects of the invention can be attained by the following.

(1) In a method for the electrolytic treatment of bleach-fix baths by which an anode and a cathode that are submerged in a spent bleach-fix bath resulting from the bleach-fix treatment of color photographic materials are supplied with an electric current, whereby the silver dissolved in the spent bleach-fix bath as a silver complex salt is precipitated at the cathode, the improvement comprising disengaging the cathode from the spent bleach-fix bath when no electric current is applied.

(2) In a method for the electrolytic treatment of spent bleach-fix baths resulting from the bleach-fix treatment of color photographic materials, the improvement comprising the steps of applying an electric current to both an anode and t cathode that are submerged in a spent bleach-fix bath, whereby the silver that is dissolved as a silver complex salt in the spent bleach-fix bath is precipitated in a specified amount at the cathode, and disengaging the cathode from the spent bleach-fix bath after the end of the application of the electric current.

(3) A method as recited under (2), wherein the disengagement of the cathode from the spent bleach-fix bath is accomplished by ascending the cathode in a specified amount with respect to the spent bleach-fix bath.

(4) A method as recited under (2), wherein the disengagement of the cathode from the spent bleach-fix bath is accomplished by descending the spent bleach-fix bath in a specified amount with respect to the cathode.

(5) A method as recited under (2), wherein the specified amount of the silver that is precipitated at the cathode is detected in terms of the silver concentration of the spent bleach-fix bath.

(6) A method as recited under (2), wherein the application of an electric current to both the anode and the cathode is performed between an anode compartment and a cathode compartment which are established by dividing an electrolytic cell with a diaphragm.

(7) A method as recited under (6), wherein the content of the anode compartment is agitated for at least the duration of time of current application.

(8) A method as recited under (6), wherein the spent bleach-fix bath in the anode compartment is transferred into the cathode compartment for at least the duration of time of current application.

(9) An apparatus for the electrolytic treatment of bleach-fix baths comprising an electrolytic cell containing a spent bleach-fix bath resulting from the bleach-fix treatment of color photographic materials, a cathode and an anode that are submerged within the spent bleach-fix bath in the electrolytic cell, a power supply to the cathode and the anode, and a cathode disengaging mechanism by which the cathode is submerged in or disengaged from the spent bleach-fix bath in the electrolytic cell.

(10) An apparatus as recited under (9), wherein the cathode disengaging mechanism disengages the cathode from the spent bleach-fix bath by ascending the cathode in a specified amount with respect to the electrolytic cell, the cathode being supported to be vertically movable with respect to the electrolytic cell.

(11) An apparatus as recited under (9), wherein the cathode disengaging mechanism disengages the cathode from the spent bleach-fix bath by descending the electrolytic cell in a specified amount with respect to the cathode the electrolytic cell being supported to be vertically movable with respect to the cathode.

(12) An apparatus as recited under (9), wherein the interior of the electrolytic cell is divided bye partitioning diaphragm into a cathode compartment in which the cathode is submerged within the contained spent bleach-fix bath and an anode compartment in which the anode is submerged within the contained spent bleach-fix bath.

(13) An apparatus as recited under (12), wherein the anode compartment of the electrolytic cell is equipped with agitating means.

(14) An apparatus as recited under (13), wherein the anode compartment is equipped with a first circulation pump for circulating the spent bleach-fix bath in the anode compartment, the first circulation pump serving as the agitating means.

(15) An apparatus as recited under (13), wherein the cathode has a rotatably driven hollow cylindrical shape, the diaphragm is of such a structure that it divides the electrolytic cell into cylindrical cathode and anode compartments, the means for agitating the spent bleach-fix bath being agitating blades that are driven to rotate within the anode compartment by means for rotatably driving the cathode.

(16) An apparatus as recited under (12), which has means for transferring the spent bleach-fix bath from the anode compartment to the cathode compartment.

(17) An apparatus as recited under (16), which is equipped with circulation means that supplies the cathode compartment of the electrolytic cell with the spent bleach-fix bath in a bleach-fix tank for the bleach-fix treatment of color photographic materials while causing the spent bleach-fix bath in the anode compartment of the electrolytic cell to return to the bleach-fix tank, thereby circulating the spent bleach-fix bath between the electrolytic cell and the bleach-fix tank.

(18) An apparatus as recited under (9), which has means for detecting the silver concentration of the spent bleach-fix bath.

(19) In a method of processing with bleach-fix baths which performs the electrolytic treatment of spent bleach-fix baths in parallel with the bleach-fix treatment in a bleach-fix tank in a processor of color photographic materials, the improvement comprising the steps of:

holding a cathode for electrolytic treatment in a standby position above an electrolytic cell for electrolytic treatment such that the cathode will not contact a spent bleach-fix bath until after the silver concentration of the spent bleach-fix bath in the bleach-fix tank has rose to a prescribed upper limit;

when the silver concentration of the spent bleach-fix bath in the bleach-fix tank rises to the prescribed upper limit, starting the circulation of the spent bleach-fix bath between the electrolytic cell and the bleach-fix tank, end submerging the cathode within the spent bleach-fix bath in the electrolytic cell, as well as starting the application of an electric current to both an anode and the cathode for electrolytic treatment that are within the spent bleach-fix bath, thereby commencing the electrolytic treatment for causing silver to be precipitated at the cathode; and when the silver concentration of the spent bleach-fix bath in the electrolytic cell falls to a level within a prescribed range, stopping the application of the electric current to the anode and the cathode within the spent bleach-fix bath so as to end the electrolytic treatment for causing silver to be precipitated at the cathode and rapidly disengaging the cathode from the spent bleach-fix bath, as well as stopping the circulation of the spent bleach-fix bath between the bleach-fix tank and the electrolytic cell.

(20) In a method of processing with bleach-fix baths that performs the electrolytic treatment of spent bleach-fix baths in parallel to the bleach-fix treatment in a bleach-fix tank in a processor of color photographic materials, the improvement comprising the steps of:

holding a cathode for electrolytic treatment in a standby position above an electrolytic cell for electrolytic treatment such that the cathode will not contact the spent bleach-fix bath;

when the sliver concentration of the spent bleach-fix bath in the bleach-fix tank rises to a prescribed upper limit, starting the circulation of the spent bleach-fix bath between the electrolytic cell and the bleach-fix tank so that a specified volume of the spent bleach-fix bath is introduced into the electrolytic cell;

submerging the cathode into the spent bleach-fix bath in the electrolytic cell and starting the application of an electric current to both an anode and the cathode for electrolytic treatment that are within the spent bleach-fix bath, thereby commencing the electrolytic treatment for causing silver to be precipitated at the cathode; and when the silver concentration of the spent bleach-fix bath in the electrolytic cell falls to a level within a prescribed range, stopping the application of the electric current to the anode and the cathode within the spent bleach-fix bath so as to end the electrolytic treatment for causing silver to be precipitated at the cathode and rapidly disengaging the cathode from the spent bleach-fix bath.

(21) In a processor of photographic materials having a bleach-fix tank for performing a bleach-fix treatment on color photographic materials, the improvement wherein an apparatus for the electrolytic treatment of bleach-fix baths comprising an electrolytic cell containing a spent bleach-fix bath, a cathode and an anode that are submerged within the spent bleach-fix bath in the electrolytic cell, a power supply to the cathode and the anode, and a cathode disengaging mechanism by which the cathode is submerged in or disengaged from the spent bleach-fix bath in the electrolytic cell is coupled in such a fashion as to enable the circulation of the spent bleach-fix bath between the electrolytic cell and the bleach-fix tank.

(22) A processor of photographic materials as recited under (21), wherein the bleach-fix tank or the electrolytic cell has means for detecting the silver concentration of the spent bleach-fix bath, and which processor has means for controlling the start and the end of the circulation of the spent bleach-fix bath between the bleach-fix tank and the electrolytic cell, as well as the time at which the cathode is disengaged from the spent bleach-fix bath on the basis of a control program in response to the feedback of the result of the measurement of the silver concentration in the spent bleach-fix bath.

(23) A processor of photographic materials as recited under (22), wherein the electrolytic cell has a diaphragm for dividing it into an anode and a cathode compartment, the anode compartment having agitating means, and which processor has means for controlling the intensity of agitation of the spent bleach-fix bath in the anode compartment on the basis of a control program in response to the feedback of the result of the measurement of the silver concentration in the spent bleach-fix bath.

According to the invention described above, the cathode is disengaged from the spent bleach-fix bath as long as no electric current is applied to the cathode or the anode after the end of the electrolytic treatment and this ensures that the silver that has been precipitated at the cathode will not redissolve in the spent bleach-fix bath. Compared to the prior art apparatus which prevents the redissolution of the precipitated silver by transferring the spent bleach-fix bath into a separate stock tank after the electrolytic treatment, the apparatus of the invention has no need to attach a large stock tank or any other bulky accessories and, instead, one only need attach a small-size mechanism such as a cathode disengaging mechanism which causes the cathode to move vertically with respect to the electrolytic cell in order to ensure that the silver that has been precipitated at the cathode will not redissolve in the spent bleach-fix bath.

The interior of the electrolytic cell in the apparatus for electrolytic treatment may be divided by a partitioning diaphragm into a cathode compartment in which the cathode is submerged within the contained spent bleach-fix bath and an anode compartment in which the anode is submerged within the contained spent bleach-fix bath. This arrangement ensures that the oxidizing action at the anode which converts the divalent iron salt to a trivalent state will not be canceled out by the reducing action at the cathode which reverts the trivalent iron salt to the initial divalent state.

If desired, means for agitating the spent bleach-fix bath may be provided in the anode compartment formed by partitioning with the diaphragm. This allows for positive agitation of the spent bleach-fix bath within the anode Compartment, whereby the spent bleach-fix bath in contact with the anode can be rapidly replaced by a fresh one despite the presence of the diaphragm.

For example, the anode compartment my be equipped with a first circulation pump for circulating the spent bleach-fix bath in the anode compartment such that the first circulation pump serves as the agitating means. With this arrangement, the need for providing a dedicated mechanism as the agitating means and the associated drive means is entirely eliminated and the circulation of the spent bleach-fix bath around the anode can be promoted by adopting slight design modifications without prejudice to important requirements such as one for a compact system.

In another embodiment, the cathode to be submerged within the spent bleach-fix bath in the electrolytic cell is adapted to have a rotatably driven hollow cylindrical shape and the diaphragm is adapted to have a dual cylindrical structure comprising an inner tubular membrane located on the inner circumference of the cathode and an outer tubular membrane located on the outer circumference of the cathode, whereby the anode compartment is defined on each of the inner and outer circumferences of the cathode, and the means for agitating the spent bleach-fix bath is composed of agitating blades that are driven to rotate within the anode compartment by means for rotatably driving the cathode. In this case, the means for rotatably driving the cathode also serves as means for driving the spent bleach-fix bath agitating means, thereby eliminating the need for providing the agitating means with a dedicated drive means and one only need add agitating blades that can be mounted on the cathode and, as in the case described in the preceding paragraph, the circulation of the spent bleach-fix bath around the anode can be promoted by adopting slight design modifications without prejudice to important requirements such as one for a compact system.

In yet another embodiment, the apparatus for electrolytic treatment is equipped with circulation means that supplies the cathode compartment of the electrolytic cell with the spent bleach-fix bath in a bleach-fix tank for the bleach-fix treatment of color photographic materials while causing the spent bleach-fix bath in the anode compartment of the electrolytic cell to return to the bleach-fix tank, thereby circulating the spent bleach-fix bath between the electrolytic cell and the bleach-fix tank. One only need adopt this arrangement to enable in-line processing in which the spent bleach-fix bath in the bleach-fix tank is directed into the electrolytic cell over time during the bleach-fix treatment of color photographic materials in the bleach-fix tank and then returned to the bleach-fix tank after its activity has been restored. This is an embodiment in which the apparatus for electrolytic treatment according to the invention is coupled to the bleach-fix tank in a processor of photographic materials and, in a more developed design, the apparatus may be integrated with the bleach-fix tank to become an integral part of the processor. In this way, the apparatus of the invention for performing the electrolytic treatment of spent bleach-fix bathe can be installed within a limited space.

In a more sophisticated design, a feedback mechanism may be provided based on a control circuit which controls the timings of current application and the disengagement of the cathode, as well as the intensity of agitation in the anode compartment in accordance with the result of measurement of the Ag concentration in the spent bleach-fix bath. This helps fabricate an automatic processor of color photographic materials with which the processing of color photographic materials and the functional restoration of spent bleach-fix baths can be accomplished through automated operation.

DETAILED DESCRIPTION OF THE PREFERRED EMBODIMENTS

Figure 1:
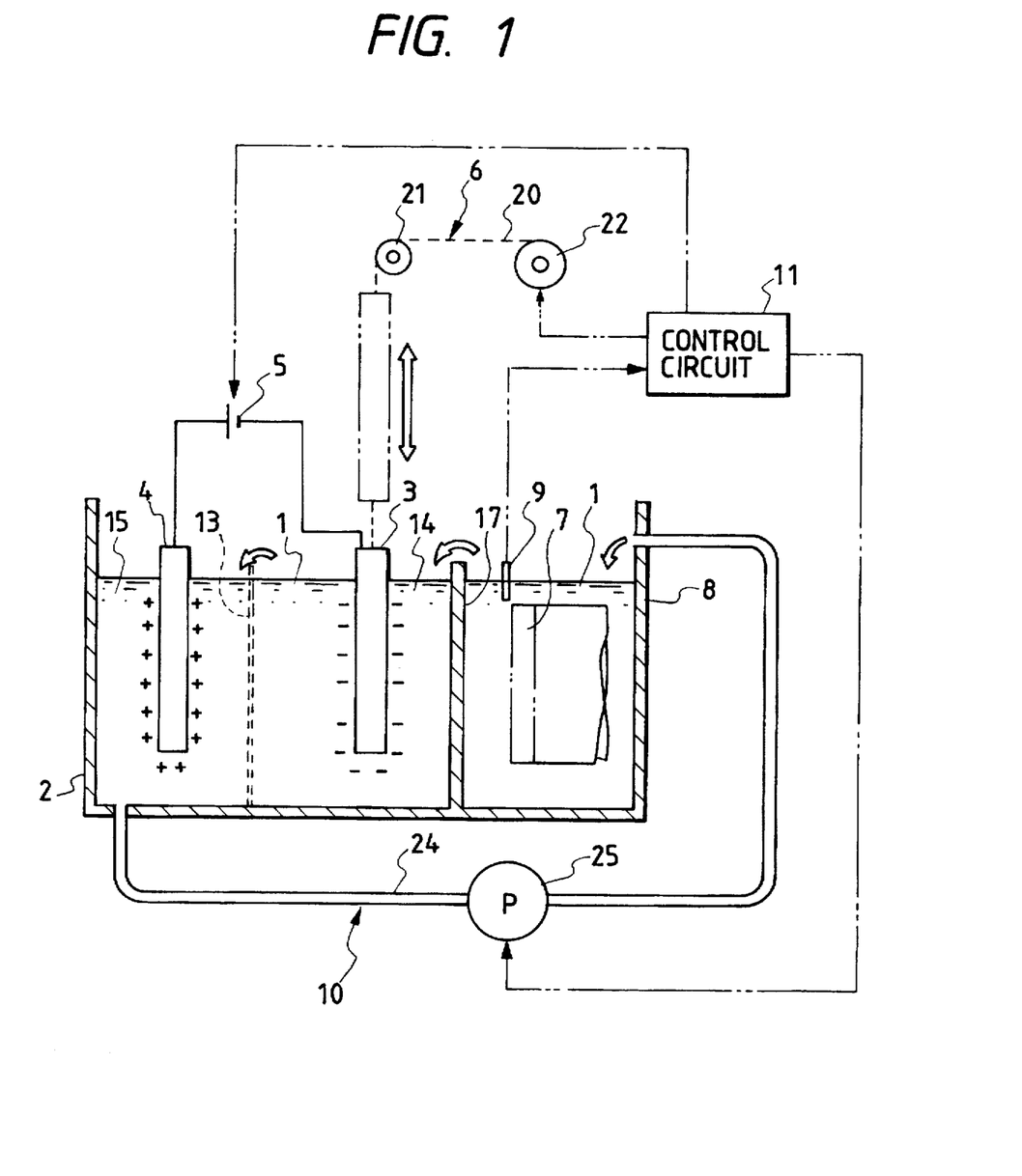
FIG. 1 shows schematically the construction of an apparatus for the electrolytic treatment of spent bleach-fix baths according to a first embodiment of the present invention.
Figure 2:
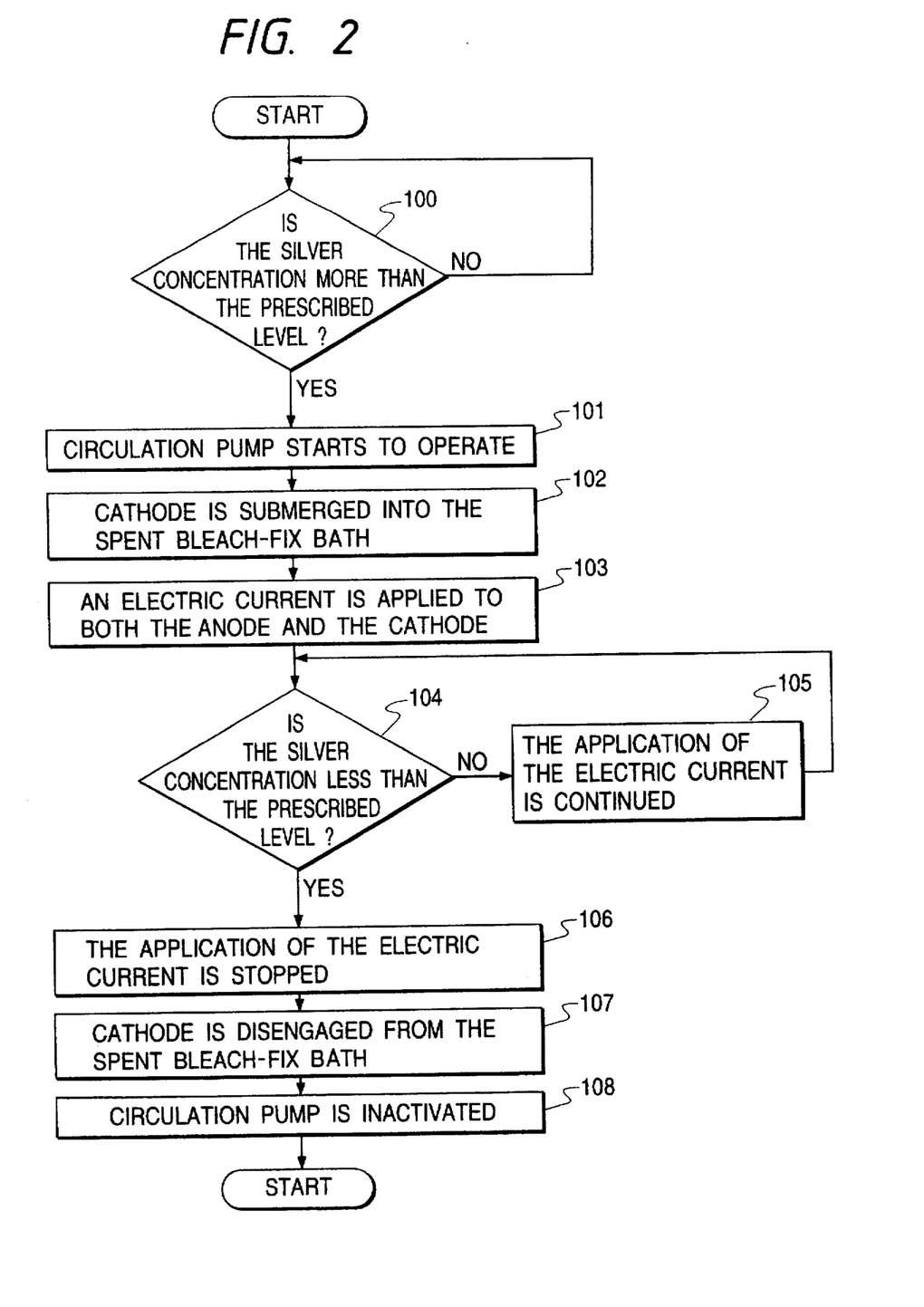
FIG. 2 is a flowchart illustrating the sequence of steps for performing the electrolytic treatment of spent bleach-fix baths according to the first embodiment of the invention.

FIG. 1 shows an apparatus for the electrolytic treatment of spent bleach-fix baths according to an embodiment of the present invention, and FIG. 2 illustrates the sequence of steps for performing the electrolytic treatment of spent bleach-fix baths using the apparatus shown in FIG. 1.

As shown, the apparatus for electrolytic treatment according to the first embodiment comprises an electrolytic cell 2 containing a spent bleach-fix bath resulting from the bleach-fix treatment of color photographic materials, a cathode 3 and an anode 4 that are submerged within the spent bleach-fix bath 1 in the electrolytic cell 2, a power supply 5 to the cathode 3 and the anode 4 which are submerged Within the spent bleach-fix bath 1, a cathode disengaging mechanism 6 by which the cathode 3 is submerged in or disengaged from the spent bleach-fix bath 1 within the electrolytic cell 2, a bleach-fix tank 8 installed adjacent the electrolytic cell 2 for performing the bleach-fix treatment of a color photographic material 7, an Ag level sensor 9 for detecting the silver concentration of the bleach-fix bath 1 in the bleach-fix tank 8, circulation means 10 for circulating the spent bleach-fix bath 1 between the electrolytic cell 2 and the bleach-fix tank 8, and a control circuit 11 which controls the operation of the cathode disengaging mechanism 6, the power supply 5 and the circulation means 10 on the basis of the values of silver concentration detected with the Ag level sensor 9.

The electrolytic cell 2 is completely partitioned from the bleach-fix tank 8 but the partitioning walls are connected to each other. Thus, in the embodiment under consideration, the electrolytic cell 2 and the bleach-fix tank 8 combine to provide an integral unit.

The interior of the electrolytic cell 2 is divided by a partitioning diaphragm 13 into a cathode compartment 14 in which the cathode 3 is submerged within the contained spent bleach-fix bath 1 and an anode compartment 15 in which the anode 4 is submerged within the contained spent bleach-fix bath 1.

The electrolytic cell 2 and the bleach-fix tank 8 are partitioned by a wall 17. The height and other dimensions of the wall 17 and the diaphragm 13 are preset at such values that when the bleach-fix tank 8 is replenished with a more-than-specified amount of the bleach-fix bath 1, the excess bleach-fix bath 1 will overflow into the cathode compartment 14 and that when the amount of the bleach-fix bath 1 being supplied from the tank 8 into the cathode compartment 14 exceeds a specified level, the excess bleach-fix bath 1 will overflow the cathode compartment 14 to get into the anode compartment 15.

The diaphragm 13 is desirably made of materials that transmit electrons and liquids but which are impervious to large ions and molecules. Examples of such materials include semipermeable membranes (e.g. cellulose acetate that is hydrolyzed on the surface, cellophane, copper ferrocyanide membranes, ladder membranes, gut membranes and agar membranes), asbestos sheets, porous sheets, glass sheets sintered glass, glass wool, nonwoven fabrics, and microporous membranes made of synthetic polymers (e.g. polyvinyl chloride, polystyrene, polysulfone, polyesters, polyethylene chloride, polyvinylidene fluoride and polypropylene).

The cathode disengaging mechanism 6 as used in the first embodiment disengages the cathode 3 from the spent bleach-fix bath 1 by ascending the cathode 3 in a specified amount with respect to the electrolytic cell 2, with the cathode 3 being supported to be vertically movable with respect to the electrolytic cell 2. To perform this function, the cathode disengaging mechanism 6 is composed basically of an insulating cord 20 connected to the top end of the cathode 3, a pulley 21 that determines the positions of the moving cathode 3 and a drum 22 which unwinds or rewinds the cord 20 in response to a control signal from the control circuit 11.

The circulation means 10 comprises a pipe 24 for supplying the bleach-fix bath 1 from the anode compartment 15 to the top of the bleach-fix tank 8 and a circulation pump 25 that is controlled by the control circuit 11 to feed the bleach-fix bath 1 from the anode compartment 15 to the bleach-fix tank 8 via the pipe 24. The circulation means 10 cooperates with the overflow mechanism composed of the diaphragm 13 and the partition wall 17 such as to accomplish the circulation of the spent bleach-fix bath 1 between the electrolytic cell 2 and the bleach-fix tank 8.

The control circuit 11 controls the operation of the power supply 5, the cathode disengaging mechanism 6 and the circulation means 10 on the basis of the detection signal from the Ag level sensor 9 such as to realize in-line processing in which the electrolytic treatment of the spent bleach-fix bath 1 is performed in the electrolytic cell 2 in parallel with the bleach-fix treatment of the color photographic material 7 within the bleach-fix tank 8.

FIG. 2 illustrates the sequence of steps in the electrolytic treatment which is effected by the control circuit 11.

The apparatus according to the first embodiment monitors the concentration of silver dissolved into the spent bleach-fix bath 1 in the bleach-fix tank 8 and this monitoring is based on the detection signal issuing from the Ag level sensor 9. The cathode 3 is held in a standby position above the electrolytic cell 2 to ensure that it will not contact the spent bleach-fix bath 1 until after the silver concentration of the spent bleach-fix bath 1 in the bleach-fix tank 8 has elevated to a prescribed upper limit. At the same time, the circulation means 10 is rendered inoperative (to be more exact, the circulation pump 25 is inoperative) so that there will be no circulation of the spent bleach-fix bath 1 between the electrolytic cell 2 and the bleach-fix tank 8 (step 100).

When the sliver concentration of the spent bleach-fix bath 1 in the bleach-fix tank 8 rises to the prescribed upper limit, the circulation means 10 starts to operate so that the spent bleach-fix bath 1 begins to circulate between the electrolytic cell 2 and the bleach-fix tank 8 (step 101); at the same time, the cathode disengaging mechanism 6 is actuated to submerge the cathode 3 into the spent bleach-fix bath 1 in the electrolytic cell 2 (step 102); and an electric current is applied to both the anode 4 and the cathode 3 in the spent bleach-fix bath 1 (step 103), thereby commencing an electrolytic treatment for precipitating silver at the cathode 3.

When the silver concentration of the bleach-fix bath 1 in the bleach-fix tank 8 has decreased to a level within a prescribed range, the application of the electric current to the anode 4 and the cathode 3 in the spent bleach-fix bath 1 is stopped to end the electrolytic treatment for precipitating silver at the cathode 3 (steps 104, 105 and 106); at the same time, the cathode disengaging mechanism 6 is actuated such that the cathode 3 is rapidly disengaged from the spent bleach-fix bath 1 (step 107); and the circulation means 10 is inactivated (step 108) to suspend the circulation of the spent bleach-fix bath 1 between the electrolytic cell 2 and the bleach-fix tank 8. If necessary, a replenisher to compensate for any other components that have been lost during the bleach-fix and electrolytic treatments may be added by suitable means (not shown).

The "prescribed upper limit" for the silver in the spent bleach-fix bath 1 as the signal for starting an electrolytic treatment is the silver concentration beyond which the activity of the bleach-fix bath 1 will drop due to a significant increase in the Ag level of that bath. The "prescribed range" of the silver concentration in the spent bleach-fix bath 1 as the signal for stopping the electrolytic treatment is the silver concentration range within which the activity of the bleach-fix bath 1 can be maintained at a satisfactory level. If the silver concentration is within this "prescribed range", the bleach-fix treatment (desilvering) can be performed without any practical problems such as sulfurization and insufficient desilvering.

The "prescribed upper limit" and the "prescribed range" for the silver concentration are variable with the types of light-sensitive materials to be processed and the bleach-fix bath to be employed but they can be readily determined by preliminary experimentation. Specific values of the "prescribed upper limit" are not limited in any way and may be preset as appropriate for the particular object. As guide figures, 10 g/L, preferably 5 g/L, may be selected in terms of $Ag^+$ when the bleach-fix treatment is to be done on color negative films, and 15 g/L, preferably 10 g/L, may be selected in terms of $Ag^+$ when color papers are to be bleach-fixed. The "prescribed range" also is not limited to any particular values and may be preset as appropriate for the particular object. As guide figures of the silver concentration for stopping the electrolytic treatment in practice, up to 5 g/L, preferably up to 2 g/L, may be selected in terms of $Ag^+$ when the bleach-fix treatment is to be done on color negative films, and up to 5 g/L, preferably up to 2 g/L, may also be selected in terms of $Ag^+$ when color papers are to be bleach-fixed.

In short, the electrolytic treatment performed in the first embodiments is such that as long as no electric current is applied to the cathode 3 or the anode 4 after the end of the treatment, the cathode 3 is disengaged from the spent bleach-fix bath 1 to ensure that the silver that has been precipitated at the cathode 3 will not redissolve into the spent bleach-fix bath 1. Compared to the prior art apparatus in which the spent bleach-fix bath that has already undergone an electrolytic treatment is transferred into a separate stock tank so as to ensure that the silver that has been precipitated at the cathode will not redissolve into the spent bleach-fix bath, the apparatus of the invention has no need to attach a large stock tank or any other bulky accessories but as in the first embodiment just described above, one only need attach a small-size mechanism such as the cathode disengaging mechanism 6 which causes the cathode 3 to move vertically with respect to the electrolytic cell 2 in order to ensure that the silver that has been precipitated at the cathode 3 will not redissolve into the spent bleach-fix bath 1. Thus, the apparatus of the invention can be constructed as a compact unit. As an added advantage, the volume of a replenisher necessary to compensate for any components that have been lost during the bleach-fix and electrolytic treatments can be reduced to 1/5 to 1/10 of the amount that has been required in the prior art technology and this is due to the smallness of the deterioration in the bleach-fix bath and the capacity of the stock tank and other accessories that may be used in the invention.

The interior of the electrolytic cell 2 in the apparatus for electrolytic treatment is divided by the partitioning diaphragm 13 into the cathode compartment 14 in which the cathode 3 is submerged within the contained spent bleach-fix bath 1 end the anode compartment 15 in which the anode 4 is submerged within the contained spent bleach-fix bath 1; this arrangement ensures that the oxidizing action at the anode 4 which converts the divelent iron salt to a trivalent state will not be cancelled out by the reducing action at the cathode which reverts the trivalent iron salt to the initial divalent state; as a result, the activity of the spent bleach-fix bath 1 can be rapidly restored.

The apparatus of the first embodiment is further equipped with the circulation means 10 for circulating the spent the bleach-fix bath 1 between the electrolytic cell 2 and the bleach-fix tank 8 and this enables in-line processing in which the spent bleach-fix bath 1 in the bleach-fix tank 8 is directed into the electrolytic cell 2 over time during the bleach-fix treatment of color photographic material 7 in the bleach-fix tank 8 and returned to the tank 8 after its activity has been restored to a satisfactory level, and this contributes to a significant improvement in the efficiency of processing of the color photographic material 7.

The cathode disengaging mechanism 6 used in the first embodiment is so adapted that the cathode 3 is vertically movable with respect to the electrolytic cell 2. If desired, the electrolytic cell 2 may be adapted to be vertically movable with respect to the cathode 3 such that the cathode 3 is disengaged from the spent bleach-fix bath 1 by descending the electrolytic cell 2 in a specified amount with respect to the cathode 3.

The specific structure of the cathode disengaging mechanism 6 is in no way limited to the case illustrated above for the first embodiment and various known mechanisms for affecting vertical movement may be substituted.

In the first embodiment, the interior of the electrolytic cell 2 is divided into two compartments by the diaphragm 13 but it should be noted that the requirement for a compact system and other objects of the invention can satisfactorily be met without the diaphragm 13.

The specific structure of the circulation means 10 also is not limited to the case illustrated above for the first embodiment.

In the first embodiment, the right time to perform an electrolytic treatment is determined by monitoring the silver concentration of the spent bleach-fix bath 1 in the bleach-fix tank 8 with the Ag level sensor 9. However, instead of the Ag sensor 9, one may use a timer or the like to repeat electrolytic treatment cycles of a specified time whenever the volume of color photographic material 7 (or the number of rolls) that have been processed in the bleach-fix tank 8 or the processing time has reached a specified value. Alternatively, the time to start the electrolytic treatment for silver removal and the time to stop the treatment may be determined as appropriate for a specific need without regard to the silver concentration.

In the first embodiment, the circulation means 10 keeps operating throughout the electrolytic treatment so that the spent bleach-fix bath 1 is constantly circulating between the electrolytic cell 2 and the bleach-fix tank 8. If desired, the circulation means 10 may be switched off when a specified volume of the spent bleach-fix bath 1 has been introduced into the electrotytic cell 2. When a specified volume of the spent bleach-fix bath 1 has been introduced into the electrolytic cell 2, an electrolytic treatment will be performed in the electrolytic cell 2 until the silver concentration of the spent bleach-fix bath 1 decreases to a level within the prescribed range. The time for the electrolytic treatment may be preset with a timer or, alternatively, the silver concentration in the spent bleach-fix bath 1 may be monitored with a Ag level sensor provided in the cathode compartment of the electrolytic cell 2. A flowchart for this alternative case is the same as Fig. 2 except that the circulation pump is switched off after step 101 rather than in step 108.

Figure 5:
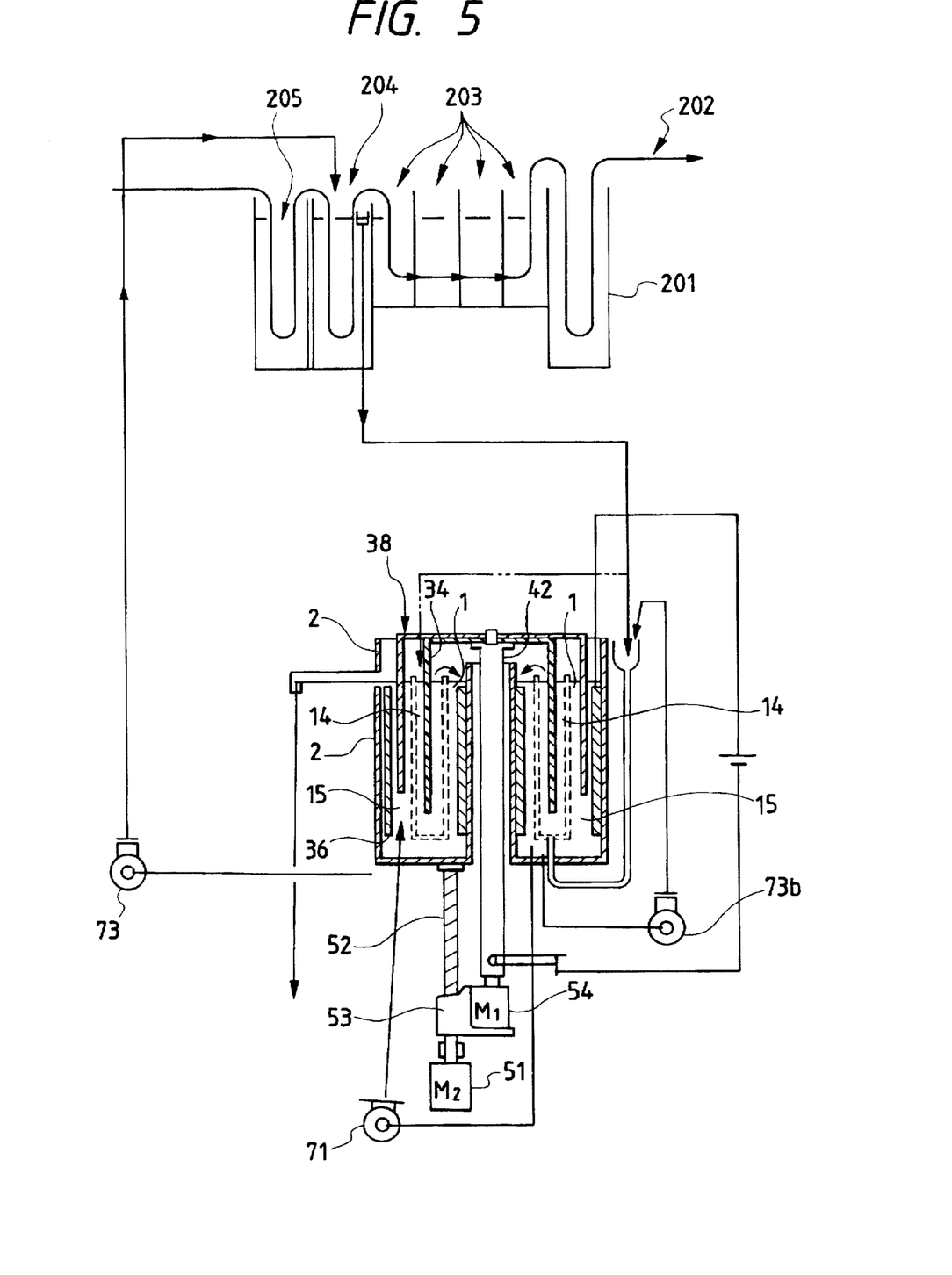
FIG. 5 shows an example of the connection between the apparatus of the invention for the electrolytic treatment of spent bleach-fix baths and a photographic processor.

Another embodiment of the invention is shown in FIG. 5, with the apparatus for electrolytic treatment according to the invention is incorporated into a processor of color negatives.

The processor generally indicated by 201 consists of a developing tank 205, a bleach-fix tank 204 and washing tanks 203 and a silver halide light-sensitive material 202 is processed as it is transported from the developing tank 205 toward the final washing tank 203. The spent bleach-fix bath 1 in the bleach-fix tank 204 overflows to be transferred quantitatively into the cathode compartment 14 of the electrolytic cell 2, where it is desilvered and overflows into the anode compartment 15. The spent bleach-fix bath in the anode compartment 15 is returned tot he bleach-fix tank 204 by means of a transfer pump 73. The spent bleach-fix bath 1 that has undergone the electrolytic treatment is thus forced out of the anode compartment 15 by means of the pump 73 to go through a circulation line consisting of bleach-fix tank 204, cathode compartment 14 electrolytic cell 2, anode compartment 15 of electrolytic cell 2, and bleach-fix tank 204.

If the overflow of bleach-fix bath 1 is insufficient in certain areas of the system, the quantity of ions in the electrolytic cell 2 becomes uneven to occasionally cause a reduced efficiency of electrolytic desilvering. However, this problem can be solved by providing a transfer pump 73b which forces the spent bleach-fix bath 1 out of the anode compartment 15 to be transferred into the cathode compartment 14.

The "transfer of the spent bleach-fix bath from the anode compartment to the cathode compartment" is effected not only in the above-stated case where the overflow of the spent bleach-fix bath 1 is insufficient but also in the case where a sufficient amount of the spent bleach-fix bath 1 overflows the cathode compartment 14 to get into the anode compartment 15 and in this latter case, the spent bleach-fix bath 1 is forced by the circulation means to flow out of the anode compartment 15 past the bleach-fix tank 104 into the cathode compartment 14.

Figure 6:
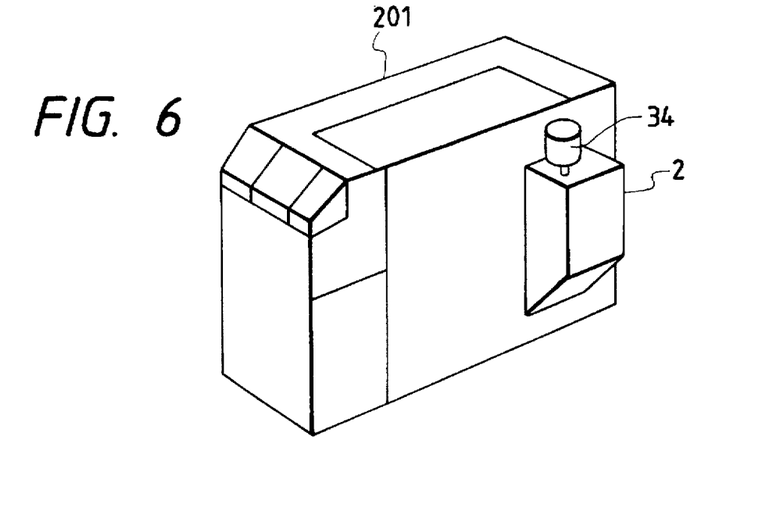
FIG. 6 is a perspective view showing the exterior of a processor of photographic materials which incorporates the apparatus of the invention for the electrolytic treatment of spent bleach-fix bath.

FIG. 6 is a perspective view showing the exterior of an exemplary processor of color negatives incorporating the above-described apparatus for electrolytic treatment. As shown, the processor generally indicated by 201 has the electrolytic cell 2 projecting from a lateral side of the housing and yet it comes in a compact unit. By special design features, one can realize a system having no projecting electrolytic cell and this is more advantageous for certain objects such as the need to install the processor in a limited space.

Another feature of the system shown in FIG. 5 is that it has a first circulation pump 71 for circulating the spent bleach-fix bath in the anode compartment 15.

Figure 3:
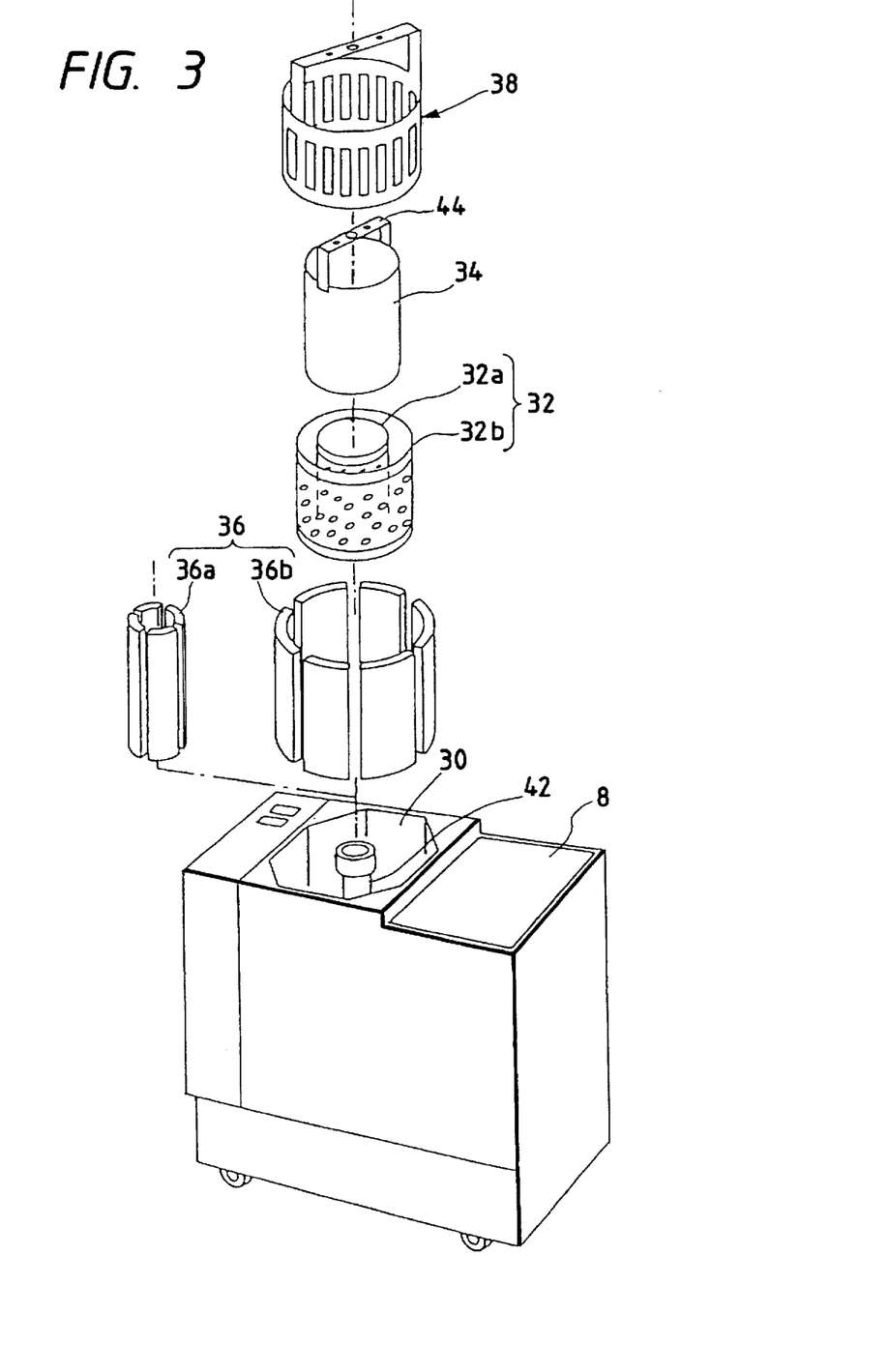
FIG. 3 shows schematically the construction of an apparatus for the electrolytic treatment of spent bleach-fix baths according to a second embodiment of the invention

In the embodiments described above, the cathode 3 and the anode 4 are shaped like a rod or plate as shown in FIG. 1 but this is not the sole case of the invention and they my be in a hollow cylindrical form as shown in FIG. 3.

The apparatus for electrolytic treatment according to the third embodiment shown in FIG. 3 comprises an electrolytic cell 30 for containing a spent bleach-fix bath 1 that comes from a bleach-fix tank 8 in which a color photographic material has been bleach-fixed, a diaphragm 32 that divides the interior of the electrolytic cell 30 into a cathode and an anode compartment, a cathode 32 submerged within the spent bleach-fix bath 1 in the cathode compartment, an anode 36 submerged within the spent bleach-fix bath 1 in the anode compartment, a power supply (not shown) to both the cathode 34 and the anode 36 which are submerged in the spent bleach-fix bath 1, and agitating means 38 for agitating the spent bleach-fix bath 1 in the anode compartment.

The electrolytic cell 30 contains a shaft 42 for rotatably supporting the cathode 34 and a motor (not shown) for driving the shaft 42 to rotate (which motor is hereunder referred to as "a cathode rotating motor"). The agitating means 38 is driven to rotate together with the cathode 34.

In the embodiment shown in FIG. 3, the cathode 34 is disengaged from the spent bleach-fix bath 1 by ascending the cathode support shaft 42. The mechanism for disengaging the cathode 34 from the spent bleach-fix bath 1 in the apparatus shown in FIG. 3 will now be described more specifically with reference to FIG. 4 which is a longitudinal section of the apparatus. In the embodiment under consideration, the cathode 34 is disengaged from the spent bleach-fix bath 1 with the aid of a ball screw 52. The cathode 34 is driven to rotate by means of a cathode rotating motor 54. The cathode 34 is supplied with an electric current via a slip ring 55. To disengage the cathode 34 from the spent bleach-fix bath 1, a cathode up/down motor 51 is run, whereupon the ball screw 52 is rotated to move a ball nut 53 either up or down. The ball nut 53 couples with the motor 54 such that it moves vertically in unison with the latter. When the motor 51 is run to move the ball nut 53 either up or down, the motor 54 will accordingly move up or down together with the ball nut 53, whereby the cathode 34 is disengaged from or submerged into the spent bleach-fix bath 1. Needless to say, the ball screw 52 may mesh with the ball nut 53 by means of another ball screw or a trapezoidal screw.

Figure 4:
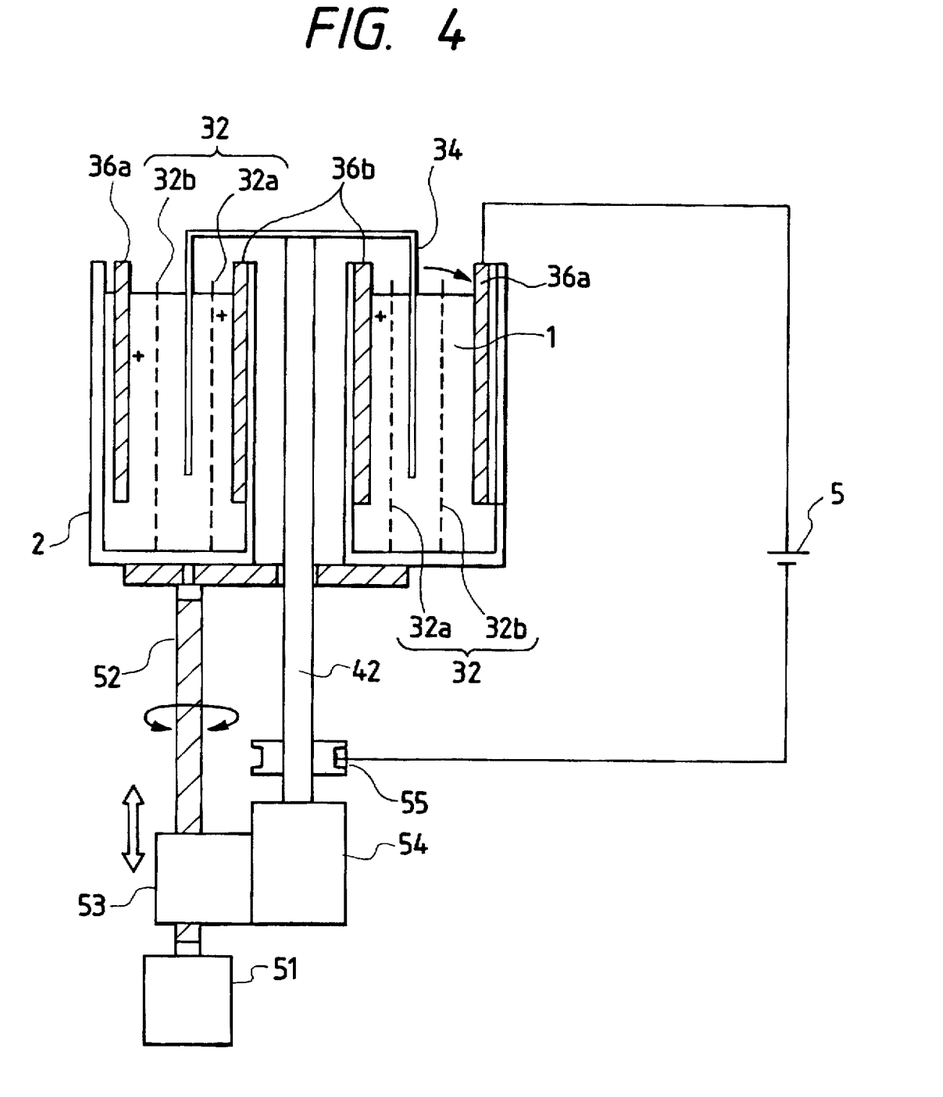
FIG. 4 is a longitudinal section of the apparatus for the electrolytic treatment of spent bleach-fix baths according to the second embodiment of the invention.

As already mentioned, the method for disengaging the cathode 34 from the spent bleach-fix bath in the embodiment under consideration is by ascending the cathode 34 while descending the electrolytic cell 2.

Instead of moving the cathode up and down, the electrolytic cell may be vertically moved to disengage the cathode from the spent bleach-fix bath but this requires an increased motor power. While there are several factors to be considered such as the behavior of the electrolytic cell as it is moved containing the spent bleach-fix bath, the concept of moving the electrolytic cell vertically provides a new approach and has a great potential for practical application from a mechanistic viewpoint.

To ascend the cathode drum, an up/down motor for causing its vertical movement and the associated mechanism will suffice; the mechanism for achieving the vertical movement of the cathode drum is very common in terms of mechanical structure and can be realized by various methods including the use of a linear motor, the combination of a screw thread or a ball screw, the use of a link mechanism, the use of an air cylinder or a hydraulic cylinder, end the combination of a belt and pulleys. For implementing the methods using a screw thread and an air cylinder, various types of high-performance linear actuators and air cylinders or various specifications are commercially available at low cost.

Figure 7:
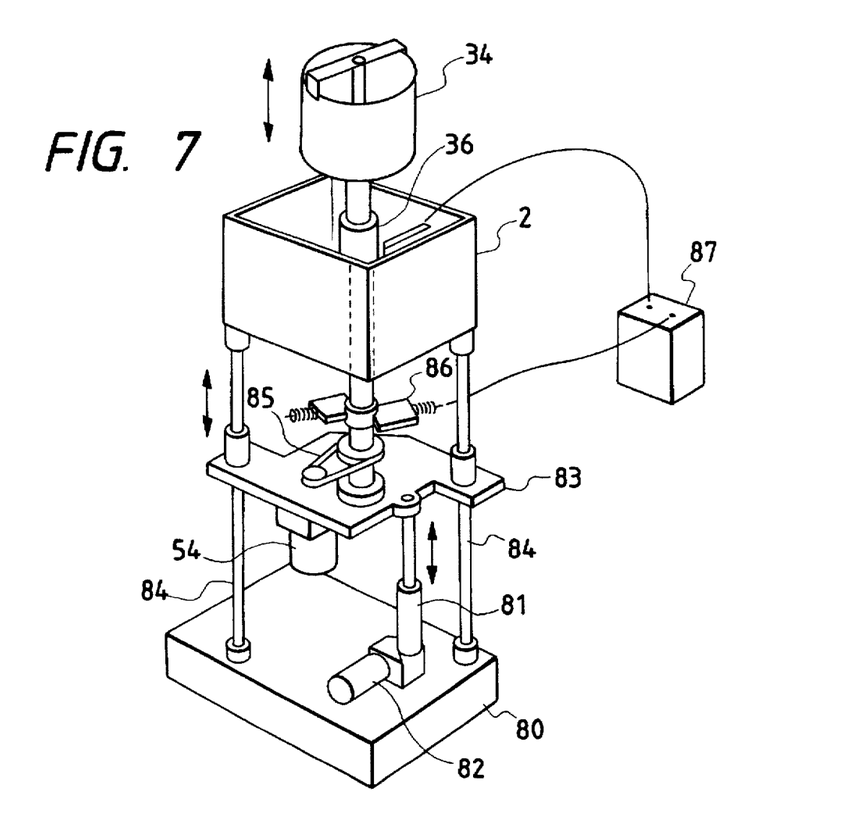
FIG. 7 is a perspective view showing an example of the cathode disengaging mechanism in the apparatus of the invention for the electrolytic treatment of spent bleach-fix baths.

FIG. 7 illustrates an examples of the cathode disengaging mechanism that utilizes a motor actuator. A fixed base 80 carries an actuator 81 which has its arm displaced By running an actuator motor 82, whereupon a moving base 83 is displaced vertically. The moving base 83 is vertically slidable along support shafts 84 erected on the fixed base 80. A cathode support shaft 42, a cathode rotating motor, cathode drive pulleys 85 and any other necessary parts are mounted on the moving base 83, with the cathode 34 being mounted at the distal end of the cathode support shaft 42. If the base 85 moves either up or down, these parts will altogether move up or down, causing the cathode 34 to move accordingly. Electrically conductive brushes 86 are mounted on the cathode support shaft 42 such that a negative voltage from a dc power source 84 is applied to the shaft 42.

Various specifications of actuator 81 are commercially available from many companies such as KSS Co., Ltd. and Japan Cosmotek Co., Ltd. In particular, the ball screw unit of KSS Co., Ltd. stops moving under overload, so it can achieve the intended object by coarse control as exemplified by the absence of the need for position detection.

As shown in FIG. 3, the cathode 34 has a hollow cylindrical shape with a mounting bar 44 being provided above and across the top open end in such a way that it is supported by the shaft 42 to ensure that the cathode 34 is driven to rotate by means of the cathode rotating motor.

The diaphragm indicated by 32 in FIG. 3 is adapted to have a dual hollow cylindrical structure comprising an inner tubular membrane 32a located on the inner circumference of the cathode 34 and an outer tubular membrane 32b located on the other circumference of the cathode 34, whereby the anode compartment is defined on each of the inner and outer circumferences of the cathode 34.

The anode indicated by 36 is adapted to consist of an outer circumferential anode member 36b surrounding the outer tubular membrane 32b and an inner circumferential anode member 36a with which the inner surface of the inner tubular membrane 32 is to be lined.

Various types of color photographic materials can be used with the method and apparatus of the invention for the electrolytic treatment of spent bleach-fix baths and they include color negative films, color reversal films, color positive films, color papers and color reversal papers. Light-sensitive materials having magnetic recording layers can also be used with advantage. For light-sensitive materials having magnetic recording layers, references may be had to U.S. Pat. Nos. 5,336,589, 5,250,404, 5,229,259 and 5,215, 874, and EP 466,130A.

The magnetic recording layers in such light-sensitive materials have magnetic particles (preferably Co-coated ferromagnetic iron oxides) dispersed in binders and it is preferred that the magnetic recording layers are optically transparent and provided over the entire surface of the light sensitive materials. The magnetic particles may be treated with coupling agents as described in Unexamined Published Japanese Patent Application No. 161032/1994. The binders are preferably polymers selected from among those which are described in Unexamined Published Japanese Patent Application No. 219569/1992. The recording layers may be provided in any part of the light-sensitive materials and preferably they are provided on the side of a base remote from the emulsion layers (i.e., on the backing layer). In other preferred cases, the recording layers are overlaid with a layer containing a slip agent, and a matting agent is contained in the layer on the light-sensitive emulsion layers that is the remotest from the base.

The light-sensitive materials under consideration preferably contain antistats to ensure that they retain an antistatic property even after photographic processing. Preferred antistats include electroconductive metal oxides and ionic polymers. The antistats are preferably used to provide an electric resistance of no more than $10^{12}$ $\Omega$.cm at 25° C.×10% r.h.

The light-sensitive materials are preferably used with thin polyester bases that are improved in roll-set curl. The preferred base has a thickness of 50 to 105 μm and is made from polyethylene aromatic dicarboxylated polyesters (preferably made of benzenedicarboxylic acid or naphthalenedicarboxylic acid and ethylene glycol). Bases having glass transition points of 50° to 200° C. are preferred. The bases may be subjected to various surface treatments, among which uv irradiation, corona discharge treatment, glow discharge treatment and flame treatment are preferred. In another preferred case, the bases are heat treated at temperature between 40° C. and the glass transition temperature of the base for 0.1 to 1,500 hours either prior to the subbing of the base or after the subbing but before coating with emulsion layers. For more information about the bases, as well as the light-sensitive materials, photographic processing and cartridges, see *JIII Journal of Technical Disclosure* under No. 94-6023 (published by Japan Institute of Invention and Innovation, 1994).

The bleach-fix baths to be used with the method and apparatus of the invention for electrolytic treatment contain iron salts as the bleaching agent, and silver halide solvents as the fixing agent. Iron salts as the bleaching agent are ferric complex salts with aminopolycarboxylic acid which are the complexes of ferric ion and aminopolycarboxylic acid or salts thereof (chelatants). Examples of the bleaching agents that can be used in the present invention are described in Unexamined Published Japanese Patent Application No. 23732/1976. Silver halide solvents as the fixing agent include thiosulfates, thiocyanates, thioureas, thioglycols and water-soluble organic diols containing sulfur and oxygen in the molecule (e.g. 3,6-dithia-1,8-octandediol). The bleach-fix baths may also contain customary additives such as pH buffering salts, anti-swelling salts and stabilizers exemplified by sulfites.

According to the method and apparatus of the present invention for performing the electrolytic treatment of bleach-fix baths, the cathode is disengaged from the spent bleach-fix bath as long as no electric current is applied to the cathode or the anode after the end of the electrolytic treatment and this ensures that the silver that has been precipitated at the cathode will not redissolve into the spent bleach-fix bath. Compared to the prior art apparatus which prevents the redissolution of the precipitated silver by transferring the spent bleach-fix bath into a separate stock tank after the electrolytic treatment, the apparatus of the invention has no need to attach a large stock tank or any other bulky accessories and, instead, one only need attach a small-size mechanism such as a cathode is disengaging mechanism which causes the cathode to move vertically with respect to the electrolytic cell in order to ensure that the silver that has been precipitated at the cathode will not redissolve into the spent bleach-fix bath. Thus, the apparatus of the invention can be constructed as a compact unit. As an added advantage, the volume of a replenisher necessary to compensate for any components that have been lost during the bleach-fix and electrolytic treatments can be significantly reduced due to the smallness of the deterioration in the bleach-fix bath and the capacity of the stock and other accessories that may be used in the invention.

If the interior of the electrolytic cell in the apparatus for electrolytic treatment is divided by a partitioning diaphragm into a cathode compartment in which the cathode is submerged within the contained spent bleach-fix bath and an anode compartment in which the anode is submerged within the contained spent bleach-fix bath, one can ensure that the oxidizing action at the anode which converts the divalent iron salt to a trivalent state will not be cancelled out by the reducing action at the cathode which reverts the trivalent iron salt to the initial divalent state; as a result, the activity of the spent bleach-fix bath can be rapidly restored.

If desired, means for agitating the spent bleach-fix bath may be provided in the anode compartment. This allows for positive agitation of the spent bleach-fix bath within the anode compartment, whereby the spent bleach-fix bath in contact with the anode can be rapidly replaced by a fresh one despite the presence of the diaphragm. The agitating means may be a first circulation pump that can circulate the spent bleach-fix bath in the anode compartment and which serves as the agitating means. Alternatively, the cathode to be submerged within the spent bleach-fix bath in the electrolytic cell may be adapted to have a rotatably driven hollow cylindrical shape and the diaphragm may be adapted to have a dual cylindrical structure comprising an inner tubular membrane located on the inner circumference of the cathode and an outer tubular membrane located on the outer circumference of the cathode, whereby the anode compartment is defined on each of the inner and outer circumferences of the cathode, and the means for agitating the spent bleach-fix bath may be composed of agitating blades that are driven to rotate within the anode compartment by means for rotatably driving the cathode. In either case, the need for providing a dedicated mechanism as the agitating means and the associated drive means is entirely eliminated and the circulation of the spent bleach-fix bath around the anode can be promoted by adopting slight design modifications without prejudice to important requirements such as one for a compact system.

If desired, the apparatus of the invention may be equipped with circulation means that supplies the cathode compartment of the electrolytic cell with the spent bleach-fix bath in a bleach-fix tank for the bleach-fix treatment of color photographic materials while causing the spent bleach-fit bath in the anode compartment of the electrolytic cell to return to the bleach-fix tank, thereby circulating the spent bleach-fix bath between the electrolytic cell and the bleach-fix tank. One only need adopt this arrangement to enable in-line processing in which the spent bleach-fix bath in the bleach-fix tank is directed into the electrolytic cell over time during the bleach-fix treatment of color photographic materials in the bleach-fix tank and then returned to the bleach-fix tank after its activity has been restored and this contributes to a significant improvement in the efficiency of the processing of the color photographic materials.

The circulation of the spent bleach-fix bath between the apparatus of the invention tor electrolytic treatment and the bleach-fix tank in the photographic processor offers another advantage in that the apparatus of the invention for electrolytic treatment can be integrated with the bleach-fix tank to become an integral part of the photographic processor. In this way, the apparatus of the invention tor performing the electrolytic treatment of spent bleach-fix baths can be installed within a limited space.

In a more sophisticated design, a feed back mechanism may be provided based on a control circuit which controls the start and the end of the circulation of the spent bleach-fix bath, the timings of current application and the disengagement of the cathode, as well as the intensity of agitation in the anode compartment in accordance with the result of measurement of the Ag concentration in the spent bleach-fix bath. This helps fabricate an automatic processor of color photographic materials with which the processing of color photographic materials and the functional restoration of spent bleach-fix baths can be accomplished through automated operation.

What is claimed is:

1. A method for the electrolytic treatment of bleach-fix baths by which an anode and a cathode submerged in the spent bleach-fix bath resulting from the bleach-fix treatment of color photographic materials are supplied with an electric current, whereby the silver dissolved in the spent bleach-fix bath as a silver complex salt is precipitated at said cathode, comprising the step of:

when the silver concentration of the spent bleach-fix bath falls to the lowest level within a prescribed range, disengaging said cathode from the spent bleach-fix bath when no electric current is applied, wherein the disengaging is accomplished by mechanically raised the cathode above the spent bleach-fix bath.

2. A method of treatment with bleach-fix baths that performs electrolytic treatment of a spent bleach-fix tank in parallel to bleach-fix treatment in a bleach-fix tank in a processor of color photographic materials, comprising the steps of:

holding a cathode for electrolytic treatment in a standby position above an electrolytic cell for electrolytic treatment such that said cathode will not contact the spent bleach-fix bath;

when the silver concentration of the spent bleach-fix bath in said bleach-fix tank rises to a prescribed upper limit, starting the circulation of the spent bleach-fix bath between said electrolytic cell and said bleach-fix tank so that a specified volume of the spent bleach-fix bath is introduced into said electrolytic cell;

submerging said cathode into the spent bleach-fix bath in said electrolytic cell;

starting the application of an electric current to both an anode and said cathode for electrolytic treatment that are within the spent bleach-fix bath, commencing the electrolytic treatment for causing silver to be precipitated at said cathode; and when the silver concentration of the spent bleach-fix bath in said electrolytic cell falls to the lowest level within a prescribed range, stopping the application of the electric current to said anode and said cathode within the spent bleach-fix bath so as to end the electrolytic treatment for causing silver to be precipitated at said cathode and rapidly disengaging said cathode from the spent bleach-fix bath, wherein the disengaging is accomplished by mechanically raising the cathode above the spent bleach-fix bath.

3. A method for the electrolytic treatment of spent bleach-fix baths resulting from the bleach-fix treatment of color photographic materials, comprising the steps of applying an electric current to both an anode and a cathode that are submerged in a spent bleach-fix bath, whereby the silver that is dissolved as a silver complex salt in the spent bleach-fix bath is precipitated in a specified amount at said cathode, and when the silver concentration of the spent bleach-fix bath falls to the lowest level within a prescribed range, disengaging said cathode from the spent bleach-fix bath after the end of the application of the electric current, wherein the disengaging is accomplished by mechanically raising the cathode above the spent bleach-fix bath.

4. The method of claim 3, wherein the disengagement of said cathode from the spent bleach-fix bath is accomplished by raising said cathode in a specified amount with respect to the spent bleach-fix bath.

5. The method of claim 3, wherein the disengagement of said cathode from the spent bleach-fix bath is accomplished by also lowering the spent bleach-fix bath in a specified amount with respect to said cathode.

6. The method of claim 3, wherein the specified amount of the silver that is precipitated at said cathode is detected in terms of the silver concentration of the spent bleach-fix bath.

7. The method of claim 3, wherein the application of an electric current to both said anode and said cathode is performed between an anode compartment and a cathode compartment which are established by dividing an electrolytic cell with a diaphragm.

8. The method of claim 7, wherein the content of said anode compartment is agitated by agitating means driven to rotate together with the cathode for at least the duration of time of current application.

9. The method of claim 7, wherein the spent bleach-fix bath in said anode compartment is transferred into said cathode compartment for at least the duration of time of current application.

10. A method of processing with bleach-fix baths which performs the electrolytic treatment of spent bleach-fix baths in parallel with the bleach-fix treatment in a bleach-fix tank in a processor of color photographic materials, comprising the steps of:

holding a cathode for electrolytic treatment in a standby position above an electrolytic cell for electrolytic treatment such that said cathode will not contact a spent bleach-fix bath until after the silver concentration of the spent bleach-fix bath in said bleach-fix tank has rose to a prescribed upper limit;

when the silver concentration of the spent bleach-fix bath in said bleach-fix tank rises to the prescribed upper limit, starting the circulation of the spent bleach-fix bath between said electrolytic cell and said bleach-fix tank, and submerging said cathode within the spent bleach-fix bath in said electrolytic cell, as well as starting the application of an electric current to both an anode and said cathode for electrolytic treatment that are within the spent bleach-fix bath, thereby commencing the electrolytic treatment for causing silver to be precipitated at said cathode; and when the silver concentration of the spent bleach-fix bath in said bleach-fix tank rises to the prescribed upper limit, starting the circulation of the spent bleach-fix bath between said electrolytic cell and said bleach-fix tank, and submerging said cathode within the spent bleach-fix bath in said electrolytic cell, as well as starting the application of an electric current to both an anode and said cathode for electrolytic treatment that are within the spent bleach-fix bath, thereby commencing the electrolytic treatment for causing silver to be precipitated at said cathode; and when the silver concentration of the spent bleach-fix bath in said electrolytic cell falls to a the lowest level within a prescribed range, stopping the application of the electric current to said anode and said cathode within the spent bleach-fix bath so as to end the electrolytic treatment for causing silver to be precipitated at said cathode and rapidly disengaging said cathode from the spent bleach-fix bath, as well as stopping the circulation of the spent bleach-fix bath between said bleach-fix tank and said electrolytic cell, wherein the disengaging is accomplished by mechanically raising the cathode above the spent bleach-fix bath.

\* \* \* \* \*